United States Patent
Shui et al.

(10) Patent No.: US 6,292,230 B1
(45) Date of Patent: Sep. 18, 2001

(54) SIGNAL DISTRIBUTION APPARATUS WITH LEARNING FUNCTION

(75) Inventors: Lisa Yi Shui, Cherry Hill, NJ (US); Nathan William Andrews, Emmaus, PA (US)

(73) Assignee: Thomson Licensing S.A., Boulogne (FR)

(*) Notice: Subject to any disclaimer, the term of this patent is extended or adjusted under 35 U.S.C. 154(b) by 0 days.

(21) Appl. No.: 09/368,377

(22) Filed: Aug. 4, 1999

Related U.S. Application Data

(60) Provisional application No. 60/095,334, filed on Aug. 4, 1998.

(51) Int. Cl.[7] .............................. H04N 5/268; H04N 5/44; H04N 5/46; H04N 5/50
(52) U.S. Cl. ...................... 348/705; 348/705; 348/706; 348/734; 348/553; 348/569; 348/555; 725/133; 725/131; 725/141; 725/151; 725/153; 725/85
(58) Field of Search ..................................... 348/705, 734, 348/553, 555, 569, 706, 725; 725/131, 133, 139, 141, 151, 153, 85, 68

(56) References Cited

U.S. PATENT DOCUMENTS

| | | | |
|---|---|---|---|
| 4,463,382 | 7/1984 | Pellegrini et al. | 358/181 |
| 4,623,887 * | 11/1986 | Welles, II | 340/825.57 |
| 4,807,052 | 2/1989 | Amano | 358/194.1 |
| 4,841,367 | 6/1989 | Ichikawa et al. | 358/181 |
| 4,905,279 | 2/1990 | Nishio | 380/9 |
| 4,937,672 * | 6/1990 | Anderson | 358/181 |
| 4,996,597 | 2/1991 | Duffield | 358/181 |
| 5,028,919 | 7/1991 | Hidaka | 340/825.72 |
| 5,081,534 | 1/1992 | Geiger et al. | 358/194.1 |
| 5,134,483 | 7/1992 | Imbert et al. | 358/181 |
| 5,237,319 | 8/1993 | Hidaka et al. | 340/825.72 |
| 5,253,044 * | 10/1993 | Lamy | 358/21 R |
| 5,264,929 * | 11/1993 | Yamaguchi | 358/108 |
| 5,287,210 | 2/1994 | Sefidvash | 359/147 |
| 5,364,108 | 11/1994 | Esnouf | 273/430 |
| 5,386,251 | 1/1995 | Movshovich | 348/734 |
| 5,416,535 * | 5/1995 | Sato et al. | 348/706 |
| 5,418,527 * | 5/1995 | Yashiro | 340/825.24 |
| 5,572,263 * | 11/1996 | Kim et al. | 348/705 |
| 5,572,317 | 11/1996 | Parker et al. | 356/139.06 |
| 5,576,773 * | 11/1996 | Itagaki et al. | 348/734 |
| 5,578,999 | 11/1996 | Matsuzawa et al. | 340/825.22 |
| 5,600,382 | 2/1997 | Won | 348/705 |
| 5,691,710 | 11/1997 | Pietraszak et al. | 340/825.72 |
| 5,790,202 * | 8/1998 | Kummer et al. | 348/553 |
| 5,808,702 * | 9/1998 | Yoshinobu et al. | 348/731 |
| 5,828,417 * | 10/1998 | Itagaki et al. | 348/553 |
| 5,982,456 * | 11/1999 | Smith, Jr. et al. | 348/722 |

* cited by examiner

Primary Examiner—Reinhard J. Eisenzopf
Assistant Examiner—Paulos Natneal
(74) Attorney, Agent, or Firm—Joseph S. Tripoli; Paul P. Kiel

(57) ABSTRACT

A signal distribution apparatus having a learning feature for recognizing a remote control device code associated with a particular signal source and coupling the associated signal source to an output in response to receipt of the device code. The remote control device code may be transmitted using a universal remote control device or a dedicated remote control device associated with the particular signal source. The present invention allows a user to couple a plurality of signal sources and a display device, such as a television set, to the present signal distribution apparatus and thereafter couple a selected one of the signal sources to the display device using the universal remote control device or the dedicated remote control device. The learning feature obviates the need for a dedicated remote control for the signal distribution device.

6 Claims, 8 Drawing Sheets

SIGNAL DISTRIBUTION APPARATUS WITH LEARNING FUNCTION

This application claims the benefit of U.S. Provisional Application 60/095,334, filed Aug. 4, 1998.

BACKGROUND OF THE INVENTION

1. Field of the Invention

The present invention relates to an apparatus and a method for distributing signals from a plurality of signal sources to an output device, and more particularly, to an apparatus and a method for coupling a selected one of a plurality of signal sources to a video display device in response to a remote control code associated with the selected signal source.

2. Related Art

Modern television sets often include a plurality of input connections to accept a variety of signal formats from various signal sources. One such format is the S-VHS format which splits a video signal into a luminance component ("Y") and a chrominance component ("C") to provide an overall higher video resolution display. In recent years many video devices that use the S-VHS format have become available, including, VCRs, camcorders, digital satellite receivers, and Digital Video Disc ("DVD") players However, most television sets usually include a limited number of S-VHS input connections, usually one or two. The limited number of S-VHS input connections can be an annoying problem for a user who has a plurality of devices that provide S-VHS formatted signals. When the user wants to switch from one S-VHS source to another, the user may be required to manually ensure that the desired S-VHS source is connected to an S-VHS connection. In the case of a single S-VHS connection, the user may be required to manually disconnect any currently connected S-VHS source and connect the desired S-VHS source. As video input connections are often located on the back of a television set, having to connect and disconnect the various S-VHS signal sources to the S-VHS connections each time the user wishes to change S-VHS signal sources can be time consuming and burdensome.

One solution to the above-described problem is connecting the various S-VHS signal sources to the television set through a switching device. Such a switching device comprises a plurality of inputs, each input being coupled to a S-VHS signal source, and an output coupled to the S-VHS input connection on the television set. The user can then select the desired S-VHS source by controlling the switching device. Such a device offers the ease of connecting the S-VHS signal sources to a central device, which device can be controlled to select the S-VHS signal source to be coupled to the television set.

However, currently available S-VHS switching devices only allow the user to select the desired S-VHS signal source either by manually operating a set of switches disposed on the switching device or by using a dedicated remote control device associated with the switch device. A disadvantage of the dedicated remote control solution is that the dedicated remote control device will control only the S-VHS switching device, but not the S-VHS signal sources or the television set. This solution may be undesirable in terms of increasing remote control clutter because such a solution adds yet another remote control device that the user must learn to use and keep track of

SUMMARY OF THE INVENTION

It is an object of the invention to provide a method and an apparatus for allowing a user to select one of a plurality of S-VHS signal sources to be coupled to a display device by operating a universal remote control device or a remote control device associated with the selected S-VHS signal source. Using a universal remote control device or a remote control device associated with the desired S-VHS signal source to control a signal distribution, or switching, apparatus obviates the above-noted problem.

The object is accomplished by providing a signal switching apparatus that is capable of leaning remote control codes and thereafter responding to remote control codes associated with the various S-VHS signal sources. The remote control codes may be transmitted from a universal remote control device that allows a user to select one of a plurality of signal source devices or a dedicated remote control device associated with a particular S-VHS signal source. The remote control codes are transmitted in the form of IR signals, or similarly suitable signal transmission methods. In an exemplary embodiment, the signal switching apparatus stores the designated remote control codes, and thereafter compares a detected remote control signals with the stored remote control codes. The apparatus couples a desired signal source to a video display device when the user presses a device key associated with the desired signal source on the universal remote control device or a POWER/ON button on a dedicated remote control device associated with the desired signal source.

In particular, the present invention provides a signal distribution apparatus comprising: a switching arrangement, coupled to a plurality of signal sources and an output, for selectively coupling one of the signal sources to the output; a signal receiver for receiving remote control codes; a memory for storing a plurality of remote control codes associated with ones of the plurality of signal sources; a controller for controlling the switching arrangement in response to a received remote control code, the controller comparing the received remote control code with the remote control codes stored in memory to associate a signal source with the received remote control code, the controller controlling the switching arrangement to couple the associated signal source with the output.

BRIEF DESCRIPTION OF THE DRAWINGS

The invention will be described with reference to the accompanying drawings, wherein.

DETAILED DESCRIPTION

Figure 1:
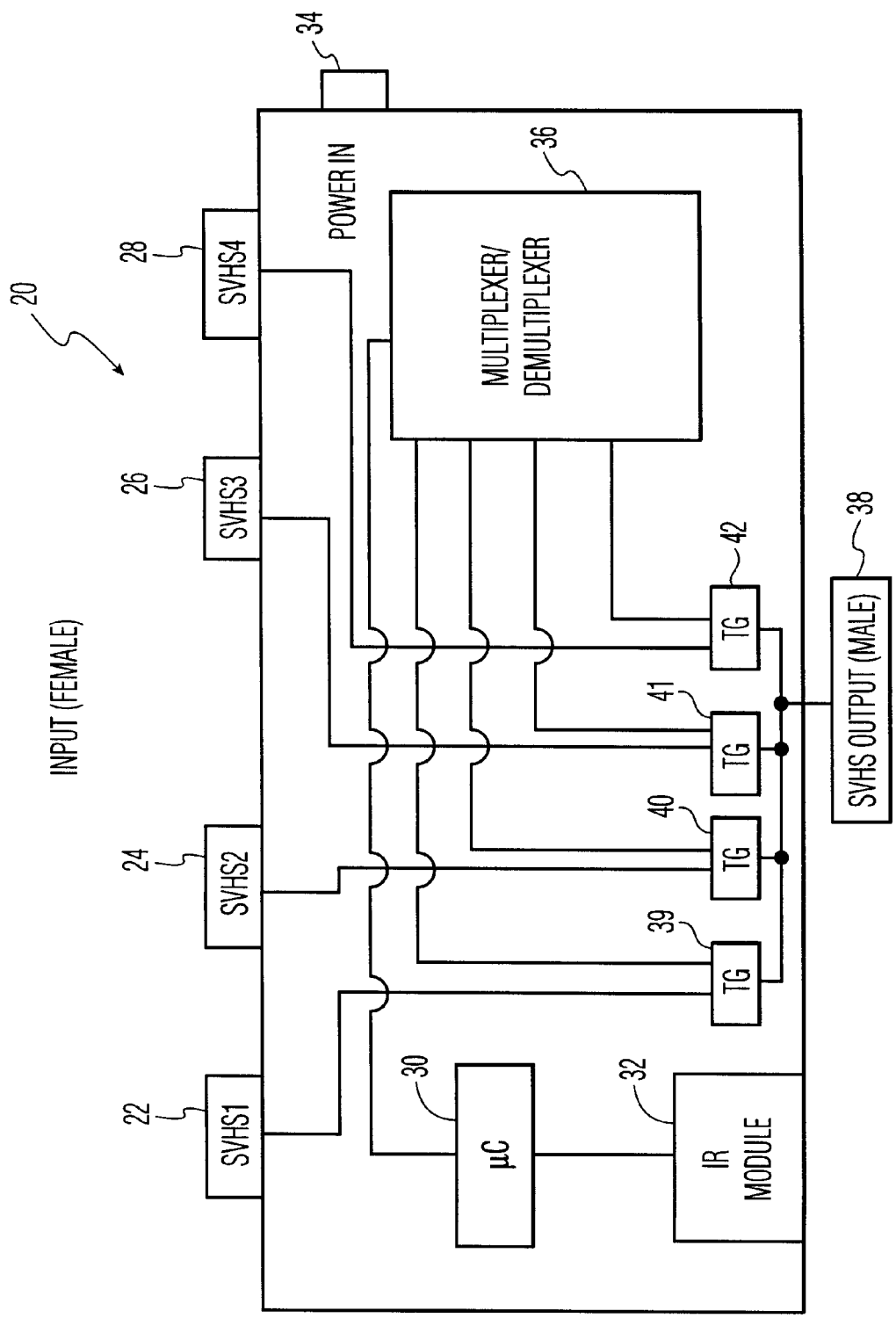
FIG. 1 is a block diagram of a signal distribution apparatus in accordance with the present invention.

FIG. 1 illustrates a block diagram of signal distribution apparatus 20 in accordance with the present invention. Signal distribution apparatus 20 comprises a plurality of signal input connections 22, 24, 26 and 28 for receiving signals from various signal sources. In the illustrated embodiment, signal inputs 22–28 are adapted to receive S-VHS video signals. However, signal inputs 22–28 may be adapted to receive any one of a plurality of video and/or audio signal formats as desired. An output signal is provided via signal output connection 38.

A desired one of signal inputs 22–28 is coupled to signal output 38 by multiplexer/demultiplexer 36. The operation of multiplexer/demultiplexer 36 is controlled by micro-controller 30 as described further below. The various remote control signals for controlling the operation of apparatus 20 is received via IR module 32, which detects the IR remote control signals and provides a demodulated remote control signal. Micro-controller 30 receives the demodulated remote control signal from IR module 32 and provides control signals to multiplexer/demultiplexer 36. Power to apparatus 20 is provided through POWER in connection 34.

Figure 6:
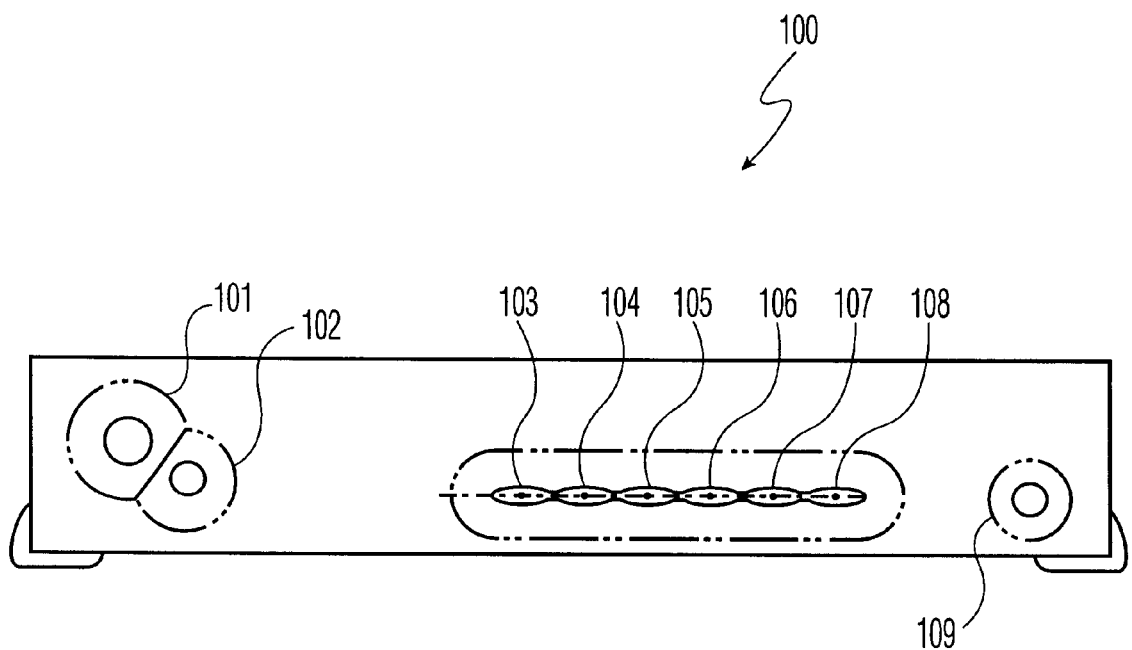
FIG. 6 illustrates a faceplate of a signal distribution device according to the present invention.

The various components of apparatus 20 are housed in an enclosure having face plate 100 illustrated in FIG. 6. Various buttons and indicators disposed on faceplate 100 allow the user to utilize the code learning function and select the desired signal source. Faceplate 100 includes POWER button 101, LEARN button 109, and a plurality of device buttons 103–108, wherein each device button is associated with a particular input connection. The input connections, and associated device buttons 103–108, may be designated for a specific type of signal source, i.e., VCR, DVD player. Each of the buttons 101, and 103–109 have an associated LED that indicates the status of apparatus 20. A user can manually cause apparatus 20 to couple a particular signal source to signal output 38 by pressing the desired device button on face plate 100. Operation of the learning function is described further below. Faceplate 100 also includes IR receiver 102 for detecting IR signals.

Figure 2A:
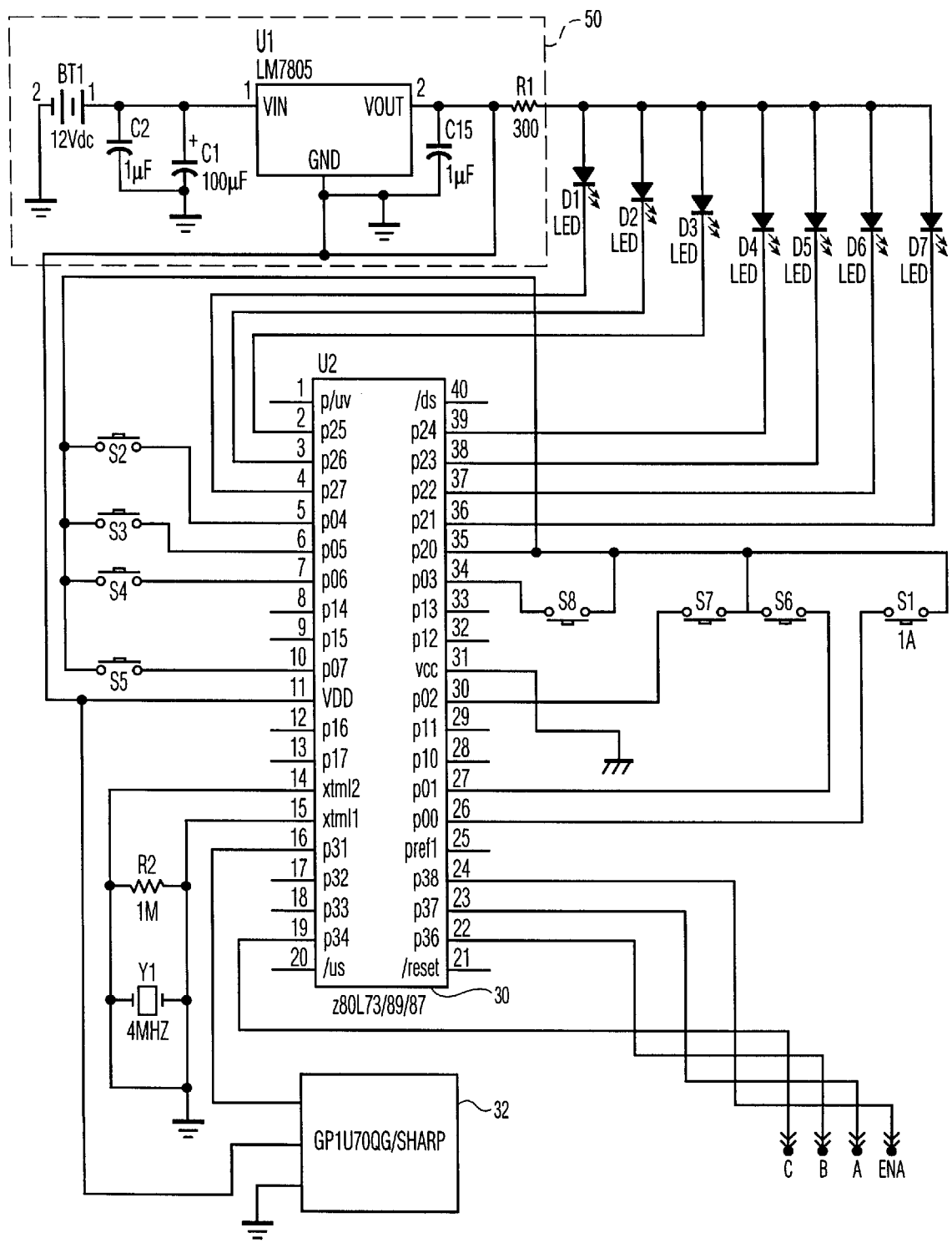
FIGS. 2A–B are schematic diagrams of an exemplary embodiment of a signal distribution apparatus in accordance with the present invention.
Figure 2B:
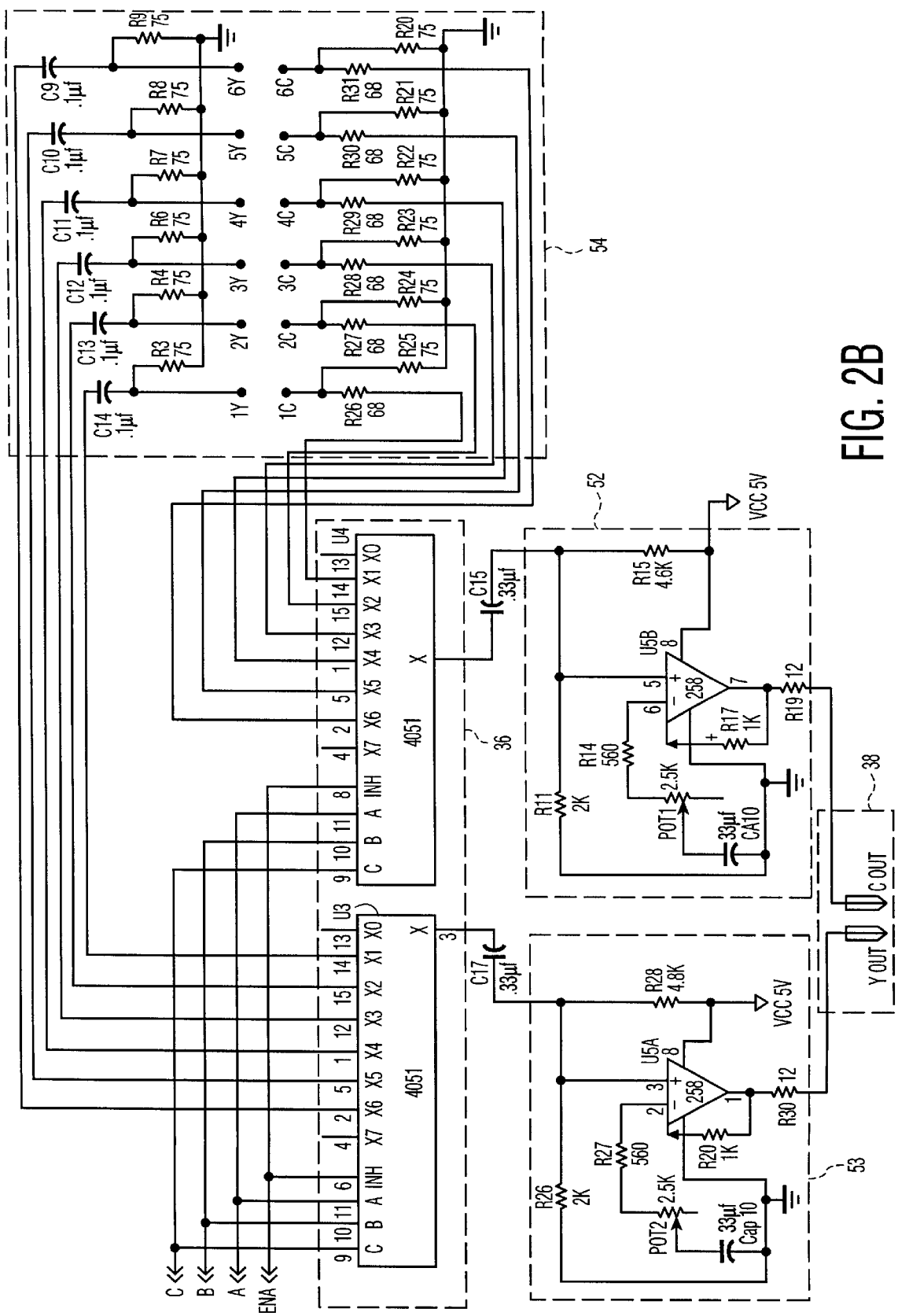

The components of apparatus 20 are further described with reference to FIGS. 2A–B. As shown in FIG. 2A, apparatus 20 comprises power supply 50, which provides regulated DC voltage for apparatus 20. Apparatus 20 includes switches S1–S8, wherein each switch corresponds to a respective button on faceplate 100. Apparatus 20 also includes a plurality of LEDs D1–D7, which appear on faceplate 100 and indicate the operating state of apparatus 20. The various LEDs indicate whether apparatus 20 is in the Learn Mode, which signal source is coupled to signal output 38, and whether apparatus 29 is turned ON.

IR module 32 detects IR remote control signals and provides a demodulated device code. IR module 32 filters out the carrier and leaves the device code. The construction and operation of an IR module for detecting IR remote control signals and providing a demodulated device code is known to those skilled in the art and any one of a plurality of conventionally available IR modules may be used, including, but not limited to, GP1U78QG manufactured by Sharp Corporation.

The outputs of switches S1–S8 and IR module 32 are provided to micro-controller 30, which controls the operation of multiplexer/demultiplexer 36. Micro-controller 30 is programmed to cause multiplexer/demultiplexer 36 to couple a particular input connection to output 38 in response to user operation of a device button 103–108 or receipt of a remote control signal as described below. The construction and operation of a micro-controller 30 that can be programmed to provide such functions is known to those skilled in the art, and any one of a plurality of conventionally available micro-controllers may be used, including, but not limited to, Z86LXX series manufactured by Zilog Corporation.

The output of micro-controller 30 is provided to multiplexer/demultiplexer 36 via lines C, B, A, and ENA Multiplexer/demultiplexer 36 comprises a set of ICs suitable for switching the input connection coupled to output 38 in response to the control signals from micro-controller 30. Suitable multiplexer/demultiplexers include, but are not limited to, HCF4051BE manufactured by SGS Thomson.

Figure 3A:
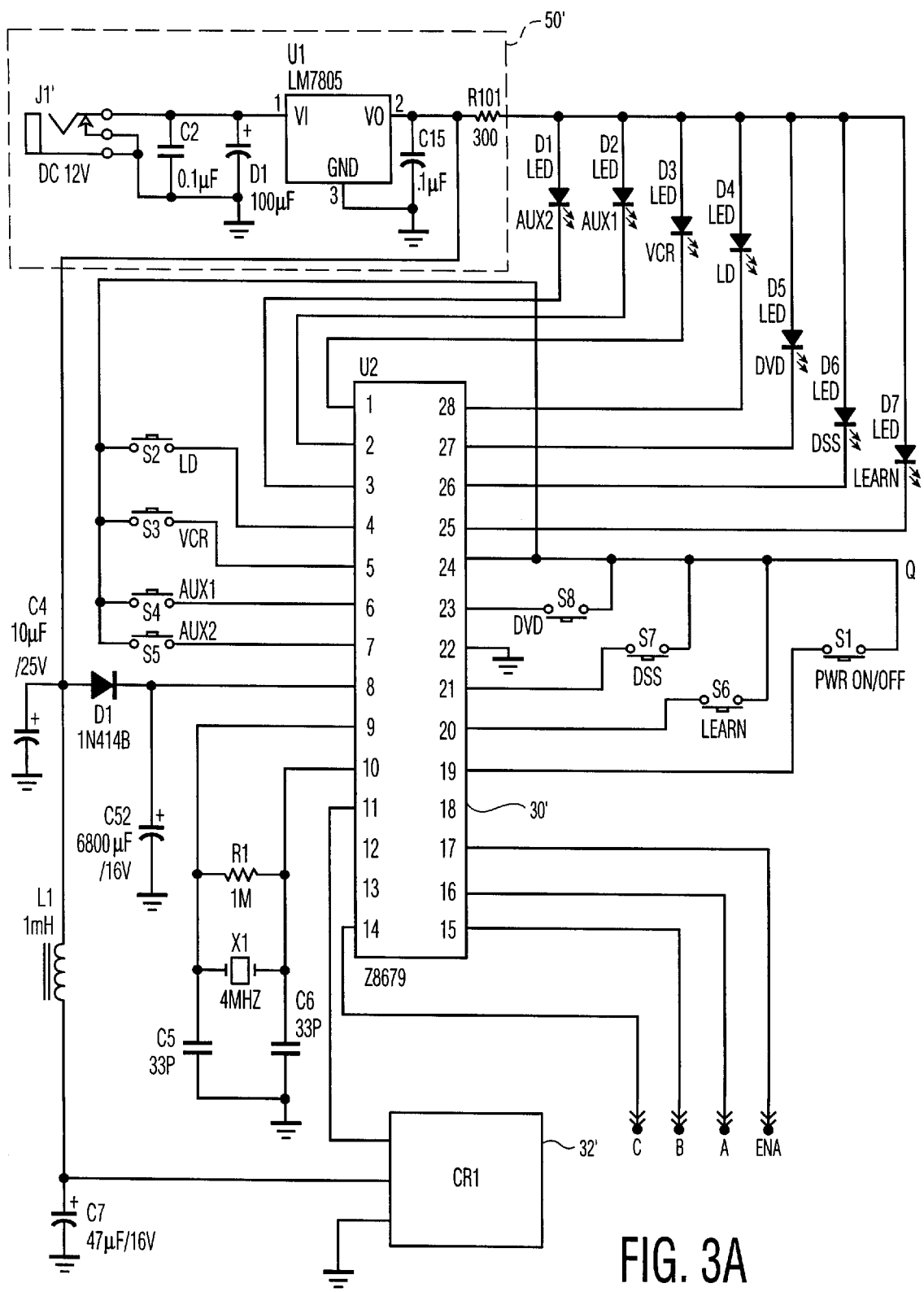
FIGS. 3A–B are schematic diagrams of an alternative embodiment of a signal distribution apparatus in accordance with the present invention.
Figure 3B:
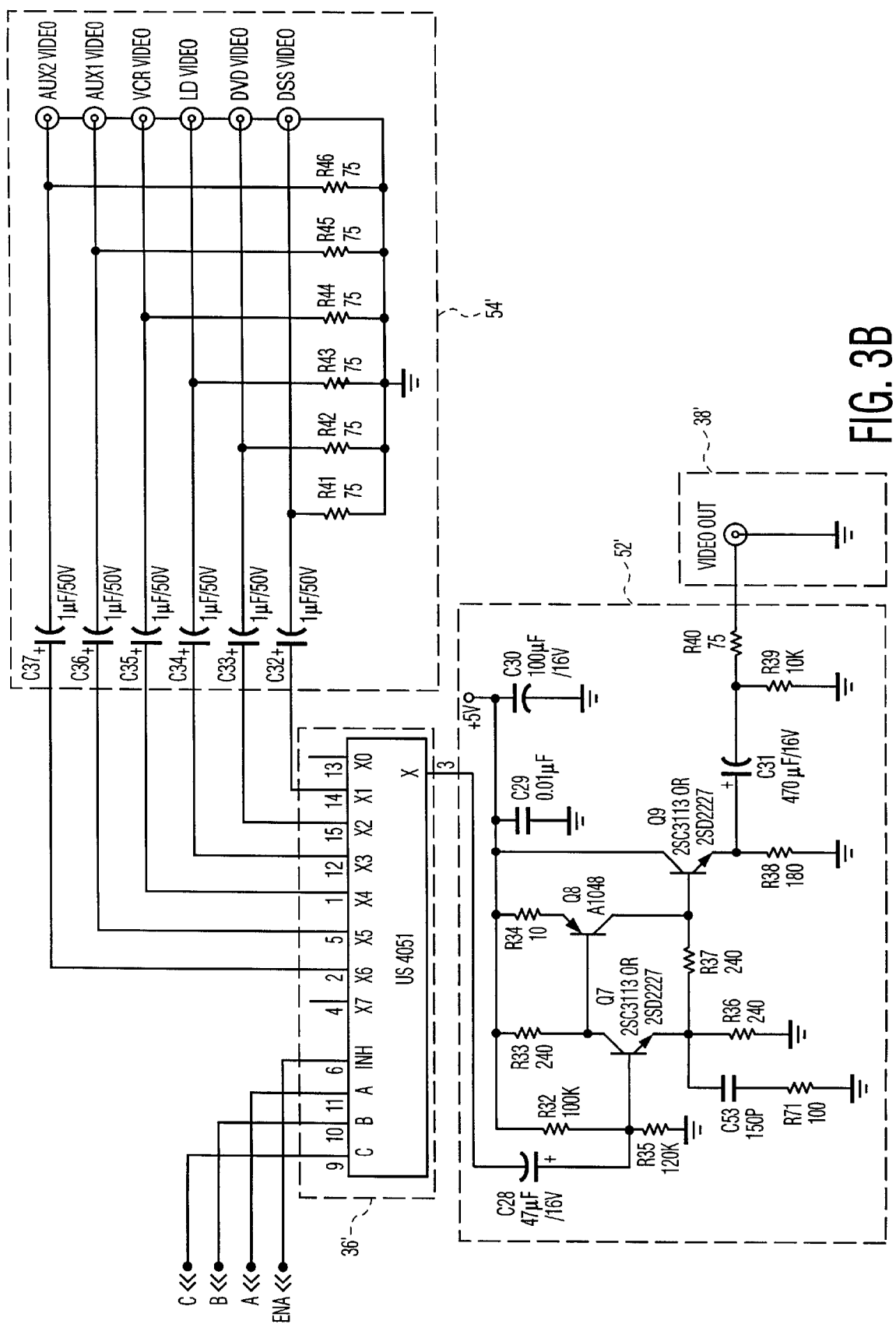

Multiplexer/demultiplexer 36 receives signals from the various signal sources via input section 54 and provides the output to output 38 through amplifiers 52 and 53. Input section 54 and amplifiers 52 and 53 provide the necessary impedance matching and amplification functions. FIGS. 3A–B illustrates an alternative embodiment of the present signal distribution apparatus wherein the corresponding components perform substantially the same functions as the components described above.

The operation of apparatus 20 is as follows. First, apparatus 20 is configured to respond to a POWER/ON signal from a dedicated remote control device associated with the signal source or a device code specifying a particular device from a universal remote control device. To place apparatus 20 in the learn mode, a user presses LEARN button 109 until the associated LED turns ON. Once in the code learn mode, the user selects the source device to be learned by pressing a desired one of device buttons 103–108. When the desired device button is pressed, the associated LED turns ON indicating that apparatus 20 is waiting to receive a remote control device signal. The user then presses the POWER/ON button on the dedicated remote control device of the source device or the desired device button on the universal remote control device. Upon valid receipt of the transmitted remote control device code, micro-controller 30 compares the received device code with the device code stored in memory for the selected device type. If the received device code is different from that stored in memory, apparatus 20 stores the received device code in a designated memory location associated with the device. Apparatus 20 acknowledges the valid receipt, identification and storage of the device code by turning OFF the LED associated with the device. This process may be repeated as necessary to teach apparatus 20 to recognize the remote control signals associated with the other signal sources.

When the learning operation is completed, the user presses LEARN button 109 again until the associated LED turns OFF to place apparatus 20 back into the monitoring mode. During the monitoring mode, apparatus 20 couples S-VHS video signal from one of the signal sources to the output device and waits for selection of another signal source from one of buttons 103–108 or remote control device codes that correspond to the remote control device code stored in the designated memory locations during the learn mode. When a device code is received, micro-controller 30 compares the received code with the device code stored in the designated memory locations to determine whether the received device code corresponds to the POWER/ON code from a dedicated remote control device or the device code from a universal remote control device stored in memory. If so, micro-controller 30 causes multiplexer/demultiplexer 36 to couple the input connection associated with the desired device with output 38.

Figure 4:
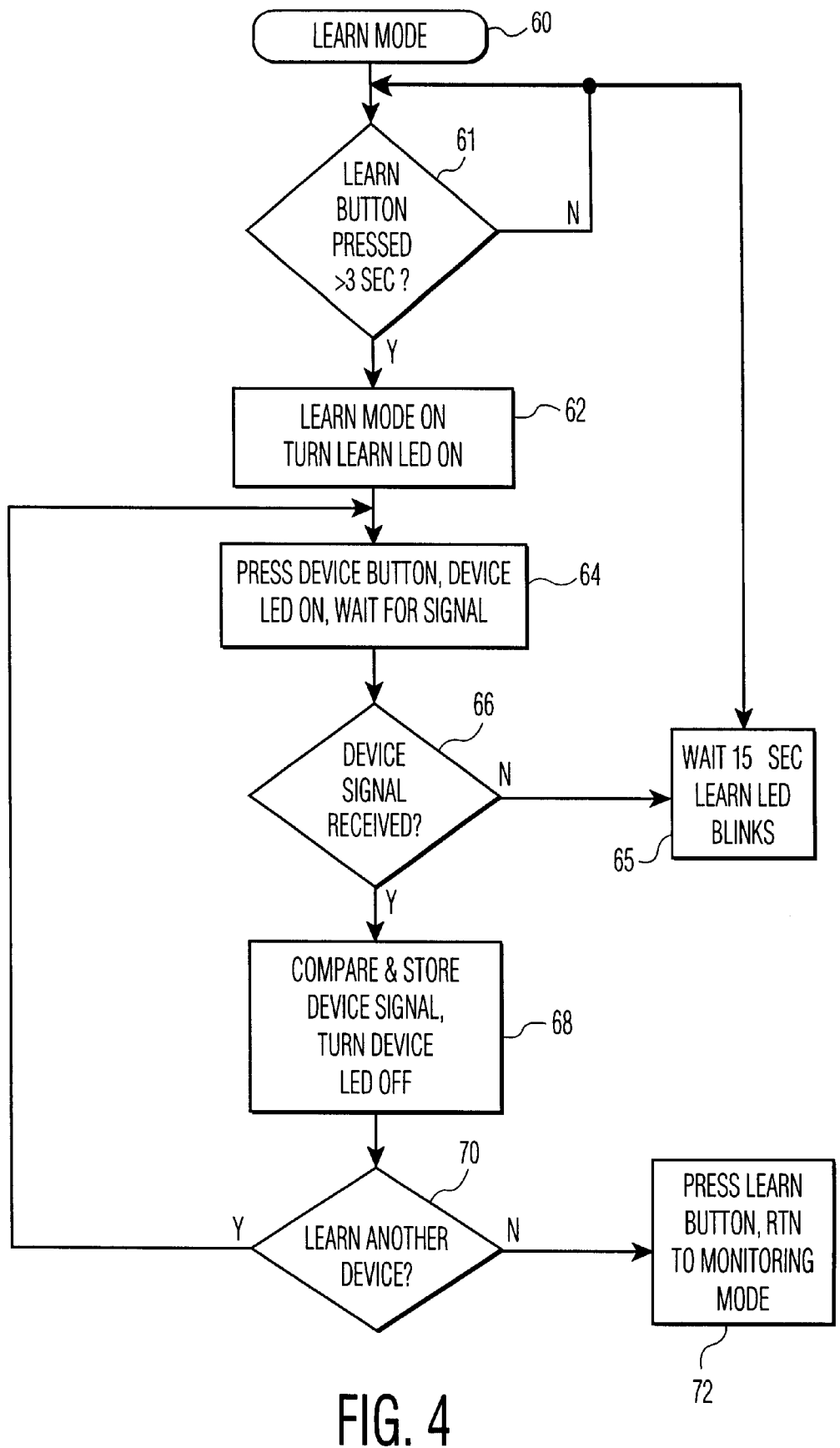
FIG. 4 is a flowchart illustrating the steps for utilizing the code learning feature of the present signal distribution apparatus.

FIG. 4 illustrates the steps for utilizing the learning function to teach signal distribution apparatus 20 to respond to a POWER/ON code or a device code from a universal remote control device. A user places apparatus 20 in Learn Mode 60 by pressing LEARN button 109. When LEARN button 109 has been pressed for a sufficient amount of time, an LED associated with LEARN button 109 turns ON to indicate that signal distribution apparatus 20 is in the learn mode. In step 64, the user presses one of the device buttons 103–108 to specify the type of device. The associated device LED turns ON and apparatus 20 waits for a valid remote control code. If an appropriate remote control code is not received within 15 seconds after entering the learn mode, as determined in step 66, apparatus 20 goes out of the learn mode and returns to the monitoring mode in step 65. If an appropriate remote control code is received within 15 seconds, the associated device LED turns OFF, and apparatus 20 compares the captured remote control code with a designated device code stored in memory. If the received device code is different, apparatus 20 stores the received remote control device code in memory in step 68. For example, if the VCR button on a universal remote control, or a POWER/ON button on a dedicated VCR remote control is pressed, the VCR LED on signal distribution apparatus 20 turns OFF to indicate that signal distribution apparatus 20 has recognized and stored the VCR associated remote control code.

If it is desired to learn another device code, as determined in step 70, the user returns to step 64 to repeat the process of pressing the desired buttons and confirming that the desired code have been captured. If it is not desired to learn another device code, the user presses the LEARN button in step 72 to return apparatus 20 to the demodulation/monitoring mode.

Figure 5:
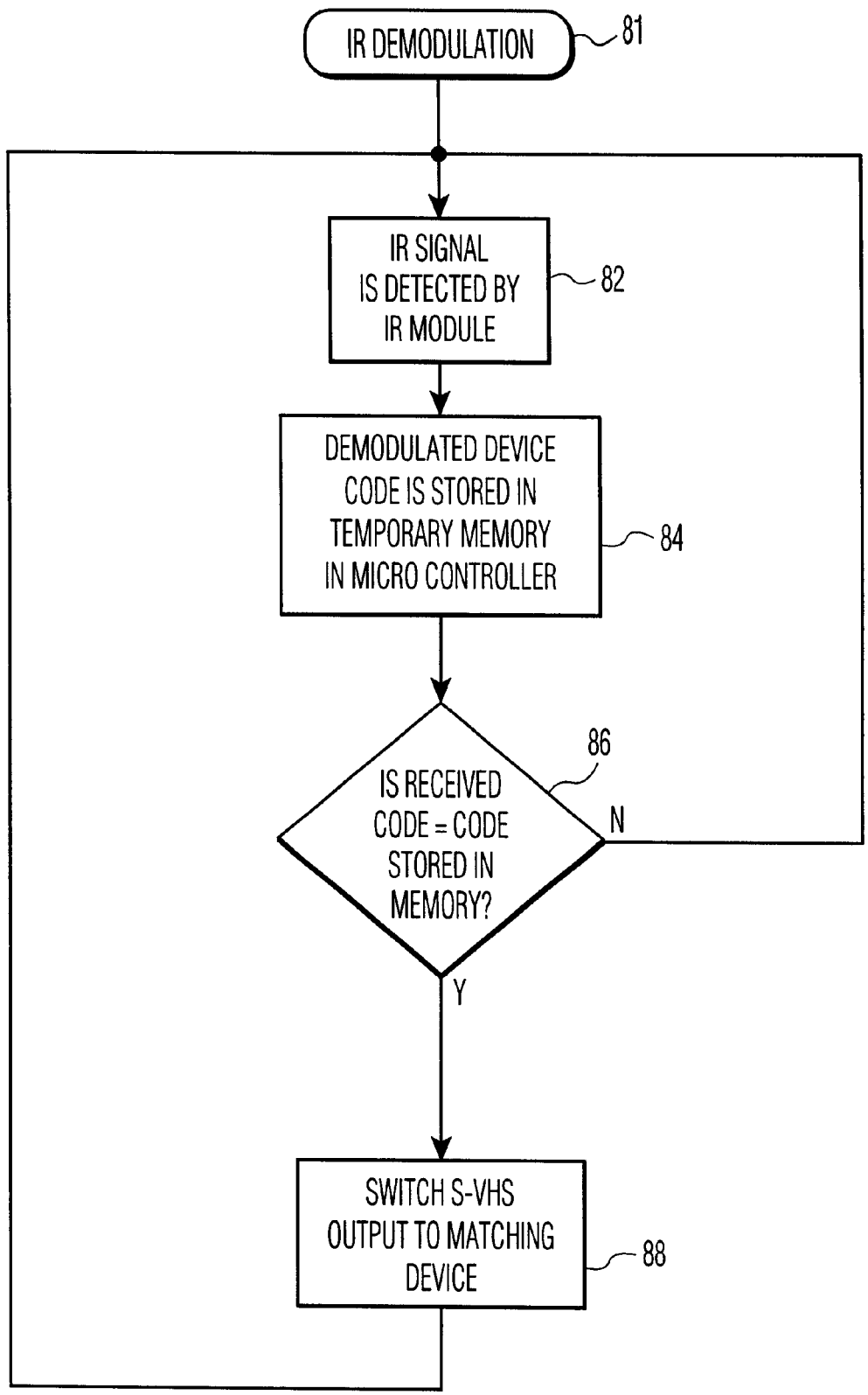
FIG. 5 is a flowchart illustrating steps for selecting a particular signal source utilizing the present signal distribution apparatus.

FIG. 5 illustrates the steps for selecting a particular signal source using signal distribution apparatus 20. In step 81, IR demodulation mode is entered, wherein apparatus 20 waits for a remote control signal. In step 82, an IR remote control signal is detected by IR module 32. In step 84, apparatus 20 stores the demodulated remote control device code into temporary memory. In step 86, apparatus 20 determines whether the received device code matches any of the device codes stored in memory. If so, apparatus 20 couples the input connection associated with the matched remote control code to the output in step 88. If not, apparatus 20 returns to step 82. For example, if the VCR button on a universal remote control device, or a POWER/ON button on a VCR remote control device is pressed, apparatus 20 couples the input connection associated with the VCR with output connection 38.

It will be apparent to those skilled in the art that although the present invention has been described in terms of an exemplary embodiment, modifications and changes may be made to the disclosed embodiment without departing from the essence of the invention. For example, apparatus 20 may be adapted to respond to RF signals as well as IR signals. Also, apparatus 20 may be adapted to respond to remote control codes other than POWERION codes from the dedicated remote control devices. Also, the remote control codes may be represented in analog form. Further, the input connections may be adapted to receive A/V signals.

It is herein recognized that the present learning feature may be implemented using any one of a number of conventionally known methods, or combination of methods, for controlling the various elements of apparatus 20 described above, for example by using embedded software in microcontroller 30. Therefore, it is to be understood that the present invention is intended to cover all modifications as would fall within the true scope and spirit of the present invention.

We claim:

1. A signal distribution apparatus, comprising:
   a switching arrangement for selectively coupling one of a plurality of signal sources to an output;
   a signal receiver for receiving a remote control code;
   a memory for storing a plurality of POWER ON remote control codes associated with respective ones of the plurality of signal sources;
   a controller for controlling the switching arrangement in response to a first POWER ON remote control code transmitted from one of a universal remote control device and a dedicated remote control device, the POWER ON remote control code being associated with a particular signal source, the controller comparing the first POWER ON remote control code with the plurality of POWER ON remote control codes stored in memory for associating the particular signal source with the received POWER ON remote control code and controlling the switching arrangement to couple the particular signal source to the output.

2. The apparatus according to claim 1, wherein the plurality of signal sources provide S-VHS formatted signals.

3. A signal distribution apparatus, comprising:
   a plurality of inputs, each input being associated with a respective POWER ON remote control code;
   an output adapted to be coupled to an output device;
   a switching arrangement, coupled to the plurality of inputs and the output, for selectively coupling one of the inputs to the output;
   a signal receiver for receiving remote control codes;
   means for learning POWER ON remote control codes associated with a respective ones of the inputs, the POWER ON remote control codes being transmitted from ones of universal remote control devices and dedicated remote control devices, the POWER ON remote control codes being associated with respective ones of a plurality of signal sources, the learning means associating each of the POWER ON remote control codes with respective ones of the inputs in response to a transmission of the POWER ON remote control codes during a learning mode, the learning means storing the POWER ON remote control codes in memory locations associated with the inputs; and
   a controller for controlling the switching arrangement in response to a received POWER ON remote control code, the controller comparing the received POWER ON remote control code with the plurality of POWER ON remote control codes stored in memory to associate the received POWER ON remote control code with a particular input and controlling the switching arrangement to couple the particular input to the output.

4. The apparatus according to claim 3, wherein the plurality of signal sources provide S-VHS formatted signals.

5. In a system comprising a signal distribution apparatus coupled to a plurality of signal sources and an output, a method for coupling a selected one of the signal sources with the output, comprising the steps of:
   storing a plurality of POWER ON remote control codes respectively associated with each signal source;
   receiving a POWER ON remote control code transmitted from a universal remote control or a dedicated remote control, the POWER ON remote control signal being associated with a particular signal source;
   comparing the received POWER ON remote control code with the plurality of stored POWER ON remote control codes to associate the particular signal source with the received POWER ON remote control code; and
   coupling the particular signal source to the output.

6. The apparatus according to claim 5, wherein the plurality of signal sources provide S-VHS formatted signals.

* * * * *